(12) United States Patent
Subramanian et al.

(10) Patent No.: US 9,171,200 B2
(45) Date of Patent: Oct. 27, 2015

(54) GESTURAL INTERACTION IDENTIFICATION

(75) Inventors: Anbumani Subramanian, Bangalore (IN); Guruprasad Hedge, Little Rock, AR (US); Sriganesh Madhvanath, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 133 days.

(21) Appl. No.: 14/003,212

(22) PCT Filed: Mar. 4, 2011

(86) PCT No.: PCT/IN2011/000137
§ 371 (c)(1),
(2), (4) Date: Sep. 4, 2013

(87) PCT Pub. No.: WO2012/120521
PCT Pub. Date: Sep. 13, 2012

(65) Prior Publication Data
US 2013/0343611 A1     Dec. 26, 2013

(51) Int. Cl.
*G06K 9/00* (2006.01)
*G06F 3/01* (2006.01)

(52) U.S. Cl.
CPC ............ *G06K 9/00335* (2013.01); *G06F 3/011* (2013.01); *G06F 3/017* (2013.01)

(58) Field of Classification Search
USPC ........................................ 382/103, 115–118
See application file for complete search history.

(56) References Cited

U.S. PATENT DOCUMENTS

| 6,128,003 | A  | * | 10/2000 | Smith et al.   | 345/157 |
| 6,560,281 | B1 | * | 5/2003  | Black et al.   | 375/240 |
| 8,457,353 | B2 | * | 6/2013  | Reville et al. | 382/103 |
| 8,745,541 | B2 | * | 6/2014  | Wilson et al.  | 715/863 |
| 8,756,532 | B2 | * | 6/2014  | Poon et al.    | 715/863 |
| 2003/0138130 | A1 | * | 7/2003 | Cohen et al.  | 382/103 |

(Continued)

FOREIGN PATENT DOCUMENTS

| CN | 101086681 A | 12/2007 |
| CN | 101719015 A | 6/2010  |

(Continued)

OTHER PUBLICATIONS

International Search Report and Written Opinion in corresponding PCT patent application PCT/IN2011/000137, dated Dec. 8, 2011.

*Primary Examiner* — Alex Liew
(74) *Attorney, Agent, or Firm* — Michael A. Dryja

(57) ABSTRACT

A method of identifying gestural interaction comprises detecting a user with an imaging device, detecting with the imaging device the depth value at the centroid of the user with respect to the imaging device, detecting with the imaging device the closest distance of the user with respect to the imaging device, and, with a processor, identifying the initiation of a gestural interaction based on the ratio of the closest distance and the depth value at the centroid of the user is above a predetermined threshold. A computer program product for identifying initiation and termination of gestural interaction within a gestural interaction system comprises a computer readable storage medium having computer usable program code embodied therewith, the computer usable program code comprising computer usable program code that identifies the initiation of a gestural interaction by a user depending on whether a virtual bubble around the user has been broken.

13 Claims, 17 Drawing Sheets

(56) References Cited

U.S. PATENT DOCUMENTS

| | | | |
|---|---|---|---|
| 2006/0036944 A1* | 2/2006 | Wilson | 715/702 |
| 2006/0210112 A1* | 9/2006 | Cohen et al. | 382/103 |
| 2007/0057911 A1* | 3/2007 | Fateh | 345/156 |
| 2008/0013793 A1* | 1/2008 | Hillis et al. | 382/114 |
| 2009/0103780 A1* | 4/2009 | Nishihara et al. | 382/103 |
| 2009/0324008 A1* | 12/2009 | Kongqiao et al. | 382/103 |
| 2010/0111358 A1* | 5/2010 | Chai et al. | 382/103 |
| 2010/0166258 A1* | 7/2010 | Chai et al. | 382/103 |
| 2010/0303289 A1* | 12/2010 | Polzin et al. | 382/103 |
| 2011/0074675 A1* | 3/2011 | Shiming et al. | 345/158 |
| 2011/0110560 A1* | 5/2011 | Adhikari | 382/103 |
| 2011/0169726 A1* | 7/2011 | Holmdahl et al. | 345/156 |
| 2011/0289456 A1* | 11/2011 | Reville et al. | 715/830 |
| 2013/0089244 A1* | 4/2013 | Acosta-Cazaubon | 382/118 |
| 2013/0107026 A1* | 5/2013 | Kim | 348/77 |

FOREIGN PATENT DOCUMENTS

| | | |
|---|---|---|
| WO | 2009124181 A2 | 10/2009 |
| WO | 2009148064 A1 | 12/2009 |
| WO | 2010134725 A2 | 11/2010 |

\* cited by examiner

GESTURAL INTERACTION IDENTIFICATION

BACKGROUND

Gestural interactive systems are computing systems that sense the movements of a user and translate those movements into commands. The commands then cause an attached computing device to execute code based on the command. These gestural interactive systems may be used in situations wherein a user may desire a more intimate, efficient, and meaningful interface with a computing device, and, more specifically, within gaming and remote control applications, for example.

However, in gestural interactive systems, unintentional movements of a user may be detected by the system and translated into commands to be performed by the gestural interactive system. These gestural interactive systems can not determine when a bona fide and intended gesture command begins and ends, and what the system can disregard as unintentional movements of the user.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
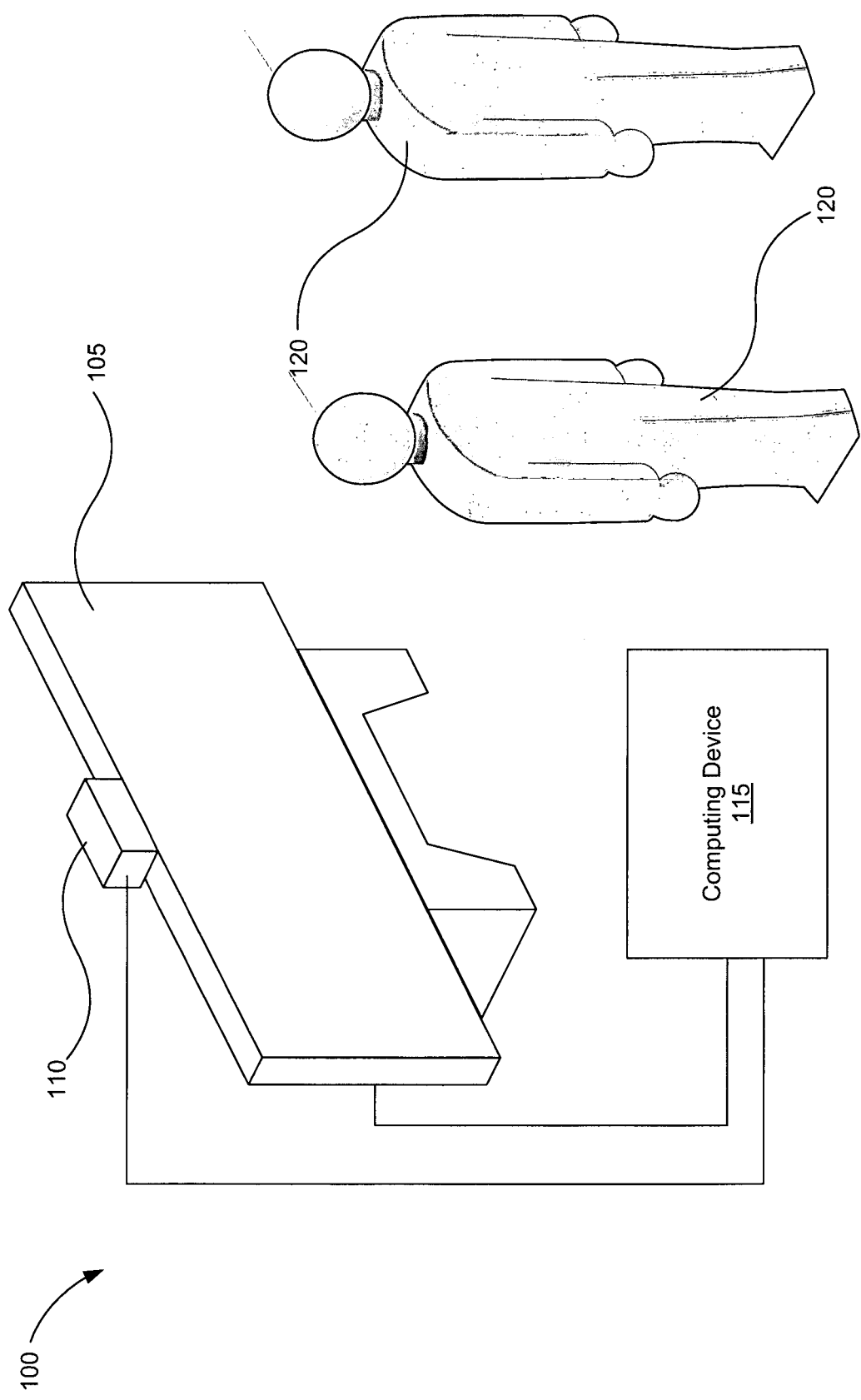
FIG. 1 is a diagram of a gestural interactive system, according to one example of the principles described herein.

A gestural interactive system is configured to detect and translate movements made by a user into commands for the computing device. The gestural interactive system may provide for the detection of a user by, for example, an imaging device coupled to a computing device. In one example utilizing an imaging device, a number of users start a gesture command or session with an explicit action of their hand or other type of gesture. These actions may include, for example, a wave of a user's hand or a pushing gesture. This explicit action that triggers the command is often artificial, non-intuitive, and confusing, especially to a first time user. Unlike systems that utilize voice-based or touch-based interactions, in a gestural interactive system, the presence or absence of a gesture can not be inferred simply by analyzing an image sequence. This difficulty in detection of presence or absence of a gesture is due to the inherent complexity in identifying the beginning and ending of a gesture or gesture sequence.

In a gestural interactive system that utilizes an imaging device, the imaging, device can detect whether a portion of a user's body has breached or broken a virtual bubble surrounding the user, the gestural interactive system recognizes such a breach as the initiation of an interactive gesture. In one example, the gestural interactive system can determine the depth value at the centroid of a user and the closest depth value of the user. Using a ratio of the closest depth value and depth value at centroid of the user, the system may detect whether some part of the user's body such as his or her hand or leg has been extended far enough away from the body to indicate the beginning of an interactive gesture. Thus, the system can detect a "bubble" or perimeter around the user, and can also detect when the user breaches or breaks that bubble with a portion of his or her body such as, for example, a hand, arm, or leg. Once this happens, the system recognizes the breaking of the bubble as the initiation of an interactive gesture or series of gestures by the user.

Thus, a method of identifying gestural interaction comprises detecting users with an imaging device and detecting with the imaging device which of the users are ready to interact with a gestural interaction system. The "ready state"

is determined when a user bursts or breaks a virtual bubble surrounding him or her. The bubble-break condition may be defined based on the desired application. A gestural interaction system may use various information from the imaging sensor such as color and depth data to compute values of different functions for each individual user. A gestural interaction method may detect a bubble-break condition of a user if the computed values satisfy a set of predetermined conditions. The method described herein detects a bubble-break condition if the ratio of the closest distance and the depth value at the centroid of the user relative to an imaging device is above a predetermined threshold.

As used in the present specification and in the appended claims, the term "gestural interactive system" is meant to be understood broadly as any system that interprets and utilizes the gestures of a user to command a processor to execute code. Some examples in which a gestural interactive system is used may comprise computer gaming systems, computing systems in which a mouse and/or keyboard is replaced with gesture interaction, remote control of media devices such as televisions and media playback devices, and robotics in which the gesture of a user is used to control a robotic device, among others.

Further, as used in the present specification and in the appended claims, the terms "bubble" or "action bubble" is meant to be understood broadly as a virtual perimeter around an imaged user as determined by the gestural interactive system. As will be discussed in more detail below, if a user breaches or breaks the bubble, the gestural interactive system recognizes such a breach as the initiation of an interactive gesture. The bubble may be determined by the gestural interactive system as being of any shape. For example, the shape of the bubble around the user may be a circle, an ellipse, a parabola, a square, a cylinder, a cube, a sphere, a spheroid, an ellipsoid, or a cone, among others. In one example, the bubble may be asymmetrical, in which the bubble provides for more space on the front and rear of the user than on the sides of the user. In another example, the bubble may be asymmetrical, in which relatively more space is provided at any portion of the bubble surrounding the user than another portion of the bubble. In this manner, the virtual bubble may be fitted around a user in a manner that best protects from unintentional gestures from occurring in the gestural interactive system. In still another example, the bubble may be shaped to fit a particular application such as, for example, an application where a user reclines or sits to interact with the gestural interactive system. The bubble is used to determine the initiation and termination of an interactive gesture.

Still further, as used in the present specification and in the appended claims, the term "a number of" or similar language is meant to be understood broadly as any positive number comprising 1 to infinity; zero not being a number, but the absence of a number.

Even still further, as used in the present specification and in the appended claims, the term "average depth" or similar language is meant to be understood broadly as any point within a captured image that is the centroid of a user with respect to an imaging device. In one example, the centroid of a user is determined using spatial locations of a number of pixels in the corresponding depth image. Further, determining the centroid of a user depends on, for example, the type of imaging device used, the nature of the depth map, the type of application being used in connection with the gestural interactive system, the posture of the users (for example, standing, reclining, or sitting), and the shape of the bubbles used, among others.

In the following description, for purposes of explanation, numerous specific details are set forth in order to provide a thorough understanding of the present systems and methods. However, the present apparatus, systems, and methods may be practiced without these specific details. Reference in the specification to "an example" or similar language means that a particular feature, structure, or characteristic described in connection with the example is included in at least that one example, but not necessarily in other examples. The various instances of the phrase "in one example" or similar phrases in various places in the specification are not necessarily all referring to the same example.

FIG. 1 is a diagram of a gestural interactive system (100), according to one example of the principles described herein. In one example, the gestural interactive system (100) may comprise a display device (105), an imaging device (110), and a computing device (115) with which the user (120) interacts through gestures or movements in general. In one example, the display device (105) may be any device that the user (120) receives visual feedback while operating the gestural interactive system (100). For example, the display may be a liquid crystal display (LCD), a light-emitting diode (LED) display, an organic light emitting diode (OLED) display, a plasma display panel, a televisions, a computer monitor, a high-definition television, a cathode ray tube (CRT) display, or a display that utilizes a projector system, among others.

The imaging device (110) of FIG. 1 may be any device that detects the presence and motion of a number of users (120). The imaging device (110) comprises a red, green, blue (RGB) camera and a depth sensor that captures full-body three dimensional (3D) motion of each user (120). The depth sensor comprises an infrared laser projector combined with a monochrome CMOS sensor, which captures data in 3D under any ambient light conditions. In another example, the depth sensor comprises a charge coupled device (CCD). The sensing range of the depth sensor may be adjustable and capable of automatic calibration of the sensor based on the user's physical environment, such as the presence of objects other than users (120) of the gestural interactive system (100). In one example, the imaging device (110) outputs video at a frame rate of approximately 30 hertz or more. The RGB video stream outputs, for example, an 8-bit VGA resolution of 640×480 pixels, and the monochrome depth sensing video stream may also have a VGA resolution of 640×480 pixels. The imaging device (110) and the computing device (115) may simultaneously capture images and process those images for a number of users (120) at different and similar distances from the imaging device (110). The imaging device (110) outputs image data to the computing device (115) for processing.

In the present example, for the purposes of simplicity in illustration, the computing device (115), the display device (105), and the imaging device (110) are separate devices communicatively coupled to each other. However, the principles set forth in the present specification extend equally to any alternative configuration in which a computing device (115), the display device (105), and the imaging device (110) are configured as one device, or two devices with one device comprising one of these devices, and the other device comprising two of these devices. As such, alternative examples within the scope of the principles of the present specification include, but are not limited to, examples in which the computing device (115), the display device (105), and the imaging device (110) are implemented by the same computing device, examples in which the functionality of the computing device (115) is implemented by multiple interconnected computers, for example, a server in a data center and a user's client machine, and examples in which the computing device (115), the display device (105), and the imaging device (110) communicate directly through a bus without intermediary network devices.

Figure 2:
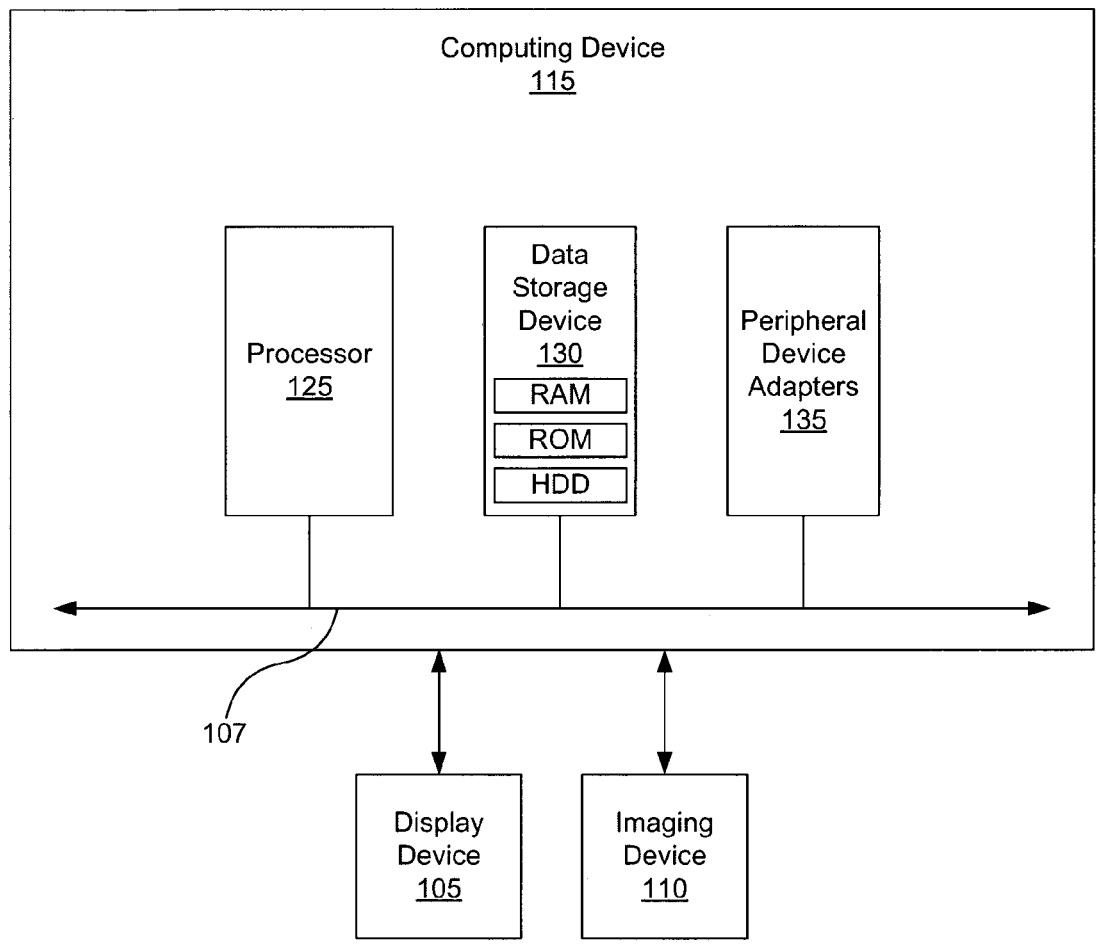
FIG. 2 is a diagram of a computing device utilized within the gestural interactive system of FIG. 1, according to one example of the principles described herein.

As mentioned above, the gestural interactive system (100) further comprises a computing device (115). The computing device will now be described in connection with FIG. 2. FIG. 2 is a diagram of the computing device (115) utilized within the gestural interactive system (100) of FIG. 1, according to one example of the principles described herein. The computing device (115) of the present example determines the initiation and termination of a number or series of gestural interactions. In the present example, this is accomplished by the computing device (115) receiving imaging data from the imaging device (110), determining the depth value at the centroid of each user (120) with respect to the imaging device (110) and determining the closest distance of each user (120) with respect to the imaging device (110).

The computing device (115) identifies the initiation or termination of a gestural interaction based on the ratio of the closest distance and the depth value at the centroid. If the ratio is above (or below in the case of an inverse calculation) a predetermined threshold, the computing device (115) recognizes this as an initiation of an interactive gesture. In this manner, the gestural interactive system (100), and, specifically, the computing device (115) may determine when a user (120) has broken an action bubble that surrounds a user (120). In one example, an inverse calculation may be performed in determining the ratio of closest distance and the depth value at the centroid. However, throughout the present specification and claims, the ratio being above a predetermined threshold will be recognized as the initiation of an interactive gesture as explained above. Illustrative processes for determining the initiation and termination of a number or series of gestural interactions are set forth in more detail below.

To achieve its desired functionality, the computing device (115) includes various hardware components. These hardware components may comprise a processor (125), a number of data storage devices (130), and peripheral device adapters (135), among others. These hardware components may be interconnected through the use of one or more busses and/or network connections. In one example, the processor (125), data storage device (130), The processor (125) may include the hardware architecture for retrieving executable code from the data storage device (130) and executing the executable code. The executable code, when executed by the processor (125), causes the processor (125) to implement at least the functionality of determining the initiation and termination of a number or series of gestural interactions as described herein. In the course of executing code, the processor (125) may receive input from and provide output to one or more of the remaining hardware units.

In one example, the computing device (115), and, specifically, the processor (125) receives imaging data from the imaging device (110). The imaging data contains, among other attributes, the depth of the various objects within the image captured by the imaging device. In this manner, the imaging device (110) is able to capture 3D data of the objects in the captured image including each user (120). In one example, background objects or other objects within the captured image that do not represent a user (120) are identified and subtracted in subsequent processing.

The processor (125) determines, based on the depth data of the captured image, a depth value at the centroid of each user (120) with respect to the imaging device (110) and the closest distance of the user (120) with respect to the imaging device (110). In one example; the centroid of a user is determined by taking into consideration the two dimensional (2D) spatial locations of the non-zero pixels within a segmented user. The depth value at the centroid location is considered for calculation purposes. Illustrative processes for determining the centroid of each user individually are set forth in more detail below. With this data, the processor (125) then determines and identifies the initiation or termination of a gestural interaction based on the ratio of the closest distance and the depth value at the centroid of a user.

In doing this, the processor (125) computes the ratio of the closest distance and the depth value at the centroid of a user and determines if that ratio is or is not above a predetermined threshold. If the ratio is above a predetermined threshold, then the processor (125) recognizes this as the initiation of an interactive gesture. The recognition of the ratio of closest distance and the depth value at the centroid of a user being above the predetermined threshold is indicative of a user (120) of the gestural interactive system (100) breaking a virtual bubble or perimeter that surrounds that user (120). Thus, recognizing that the bubble has been broken, the processor (125) then understands that the user (120) is initiating an interactive gesture, and begins to issue commands based in the user's gestures. After the initiation of a gesture has been recognized by the gestural interactive system (100), additional executable code is retrieved from the data storage device (130) and executed by the processor (125) in order to provide user interaction with the gestural interactive system (100). For example, the processor may then execute code relating to recognizing gestures, and initiate, for example, a computer game or a remote control process, among others.

In another example, the processor (125) may determine a bubble break condition based on other criteria such as, for example, the type of sensor used and its respective depth data, and the type of application being used in connection with the gestural interactive system (100), distances relative to the display device (105), among others. In one example, the gestural interactive system (100) uses the ratio of the distance of the farthest point of the user from the centroid of the user as opposed to using the ratio of the distance of the closest point from the sensor and the centroid of a user as described above. In this example, the bubble break condition is based on the ratio of the farthest point within a user with respect to the depth value of the centroid of a user. If this ratio is within a predetermined value, then the bubble break condition will not be satisfied. However, if the ratio is not within a predetermined ratio, then the bubble break condition will be satisfied, and the processor (125) of the gestural interactive system (100) may then execute code relating to recognizing gestures as described above.

In yet another example, the above bubble break condition may be based on the physical measurements of a user's body. For example, the imaging device (110) and processor may be able to determine how far the user's hand is extended from his or her body based on the length of that user's arm or other anatomical measurement.

In one example, while the ratio of the closest distance and the depth value at the centroid of a user is above the predetermined threshold, the processor (125) continues to execute the additional code based on the user's gestures. If, however, the ratio of the closest distance and the depth value at the centroid of a user falls below the predetermined threshold, or is initially below the predetermined threshold, the processor (125) does not recognize the gestures of the user (120), and does not execute the additional code based on the user's gestures. Thus, the gestural interactive system (100) ensures that unintentional gestures by the user (120) are not gestures recognized as intending to cause the system (100) to execute commands. Illustrative processes for determining the initiation and termination of a number or series of gestural interactions are set forth in more detail below.

The processor (125) may also present to the user (120) a user interface on an output device such as the display device (105). As discussed above, the user (120) interacts with the display device (105) by gestural interaction to bring about a result within the gestural interactive system (100).

The data storage device (130) may store data such as executable code as discussed above. This executable code is processed and produced by the processor (125). The data storage device (130) may include various types of memory devices, including volatile and nonvolatile memory. For example, the data storage device (130) of the present example includes Random Access Memory (RAM), Read Only Memory (ROM), and Hard Disk Drive (HDD) memory, among others. The present specification contemplates the use of many varying type(s) of memory in the data storage device (130) as may suit a particular application of the principles described herein. In certain examples, different types of memory in the data storage device (130) may be used for different data storage needs. For example, in certain examples the processor (125) may boot from Read Only Memory (ROM), maintain nonvolatile storage in the Hard Disk Drive (HDD) memory, and execute program code stored in Random Access Memory (RAM).

Generally, the data storage device (130) may comprise a computer readable storage medium. For example, the data storage device (130) may be, but not limited to, an electronic, magnetic, optical, electromagnetic, infrared, or semiconductor system, apparatus, or device, or any suitable combination of the foregoing. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The peripheral device adapters (135) in the computing device (115) enable the processor (125) to interface with various other hardware elements, external and internal to the computing device (115). For example, peripheral device adapters (135) may provide an interface to input/output devices, such as, for example, the display device (105) and the imaging device (110), a keyboard, and a mouse, among others, to create a user interface and/or access external sources of memory storage, for example.

Figure 3:
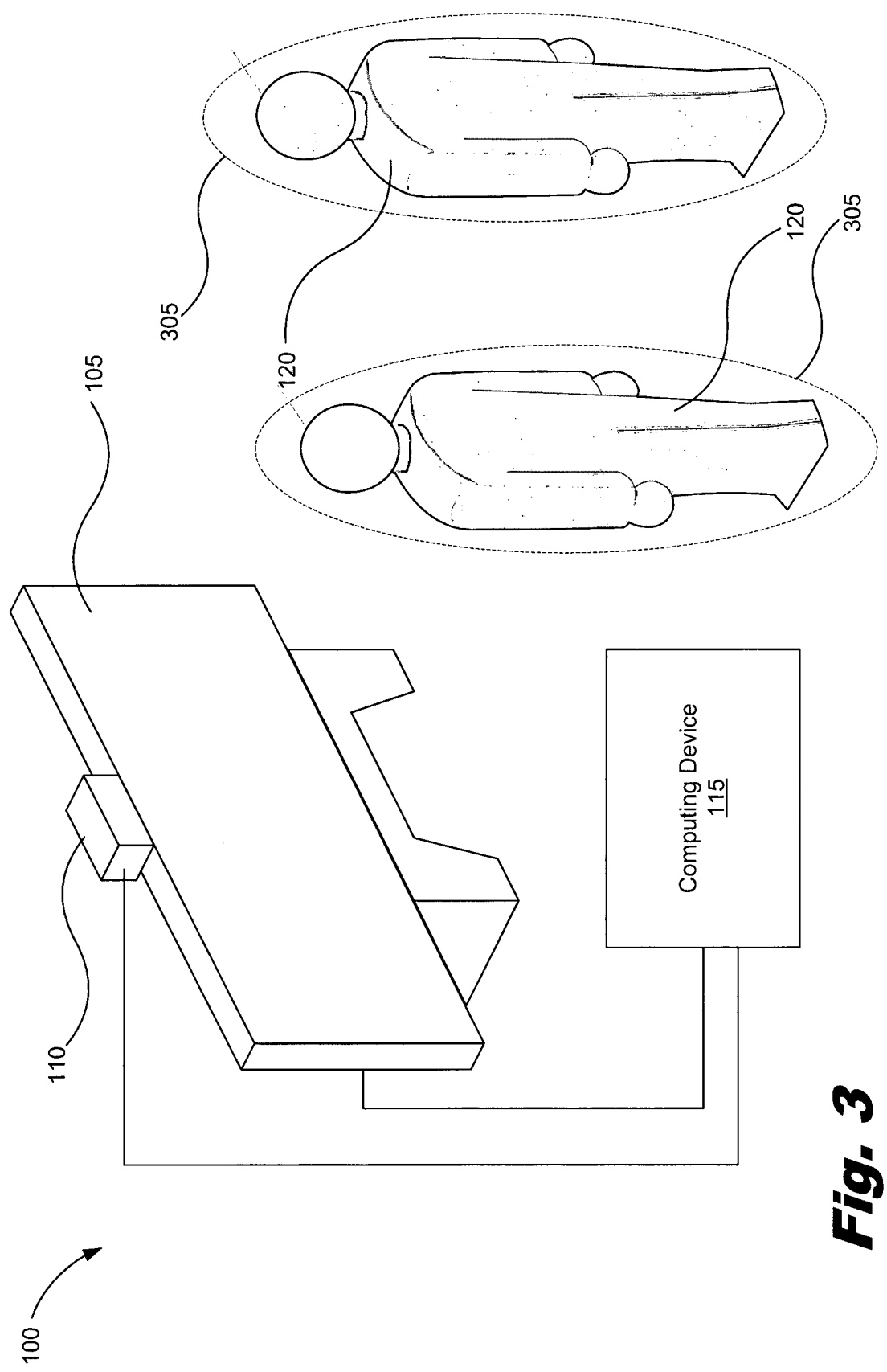
FIG. 3 is a diagram of the gestural interactive system of FIG. 1 further depicting an action bubble surrounding a user, according to one example of the principles described herein.
Figure 4:
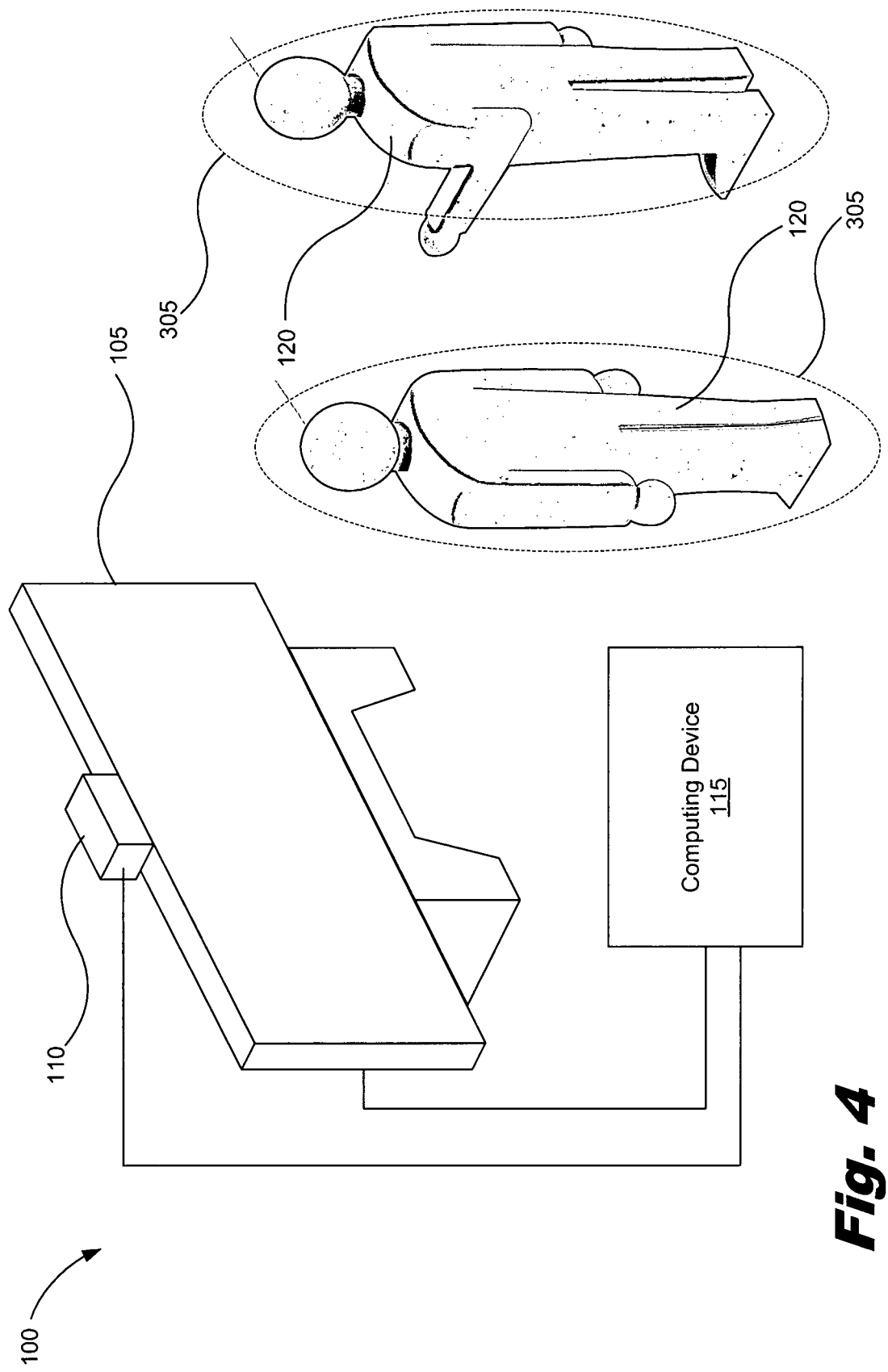
FIG. 4 is a diagram of the gestural interactive system of FIG. 1 further depicting the user breaching the action bubble to initiate gesture interaction, according to one example of the principles described herein.

FIG. 3 is a diagram of the gestural interactive system (100) of FIG. 1 further depicting an action bubble (305) surrounding a user (120), according to one example of the principles described herein. Further, FIG. 4 is a diagram of the gestural interactive system of FIG. 1 further depicting the user (120) breaching the action bubble (305) to initiate gesture interaction, according to one example of the principles described herein. As will be discussed in more detail below, the gestural interactive system (100) can determine the initiation of gestural interaction with the gestural interactive system (100) by a user (120). In practice, when a portion of the user's (120) body does not break the action bubble (305) as depicted in FIG. 3, the gestural interactive system (100) does not recognize movements by the user (120) as an intended gestural interaction, and does not interact with the user (120). However, when a portion of the user's (120) body does break the action bubble (305) as depicted in FIG. 4 with, for example, a hand, the gestural interactive system (100) recognizes this as an intended initialization of a gestural interaction by the user (120). When the gestural interactive system (100) recognizes an intentional gestural interaction by the user (120) as explained above, movements by the user (120) will be tracked, and cause the gestural interactive system (100) to execute commands based on the user's (120) movements.

Figure 5:
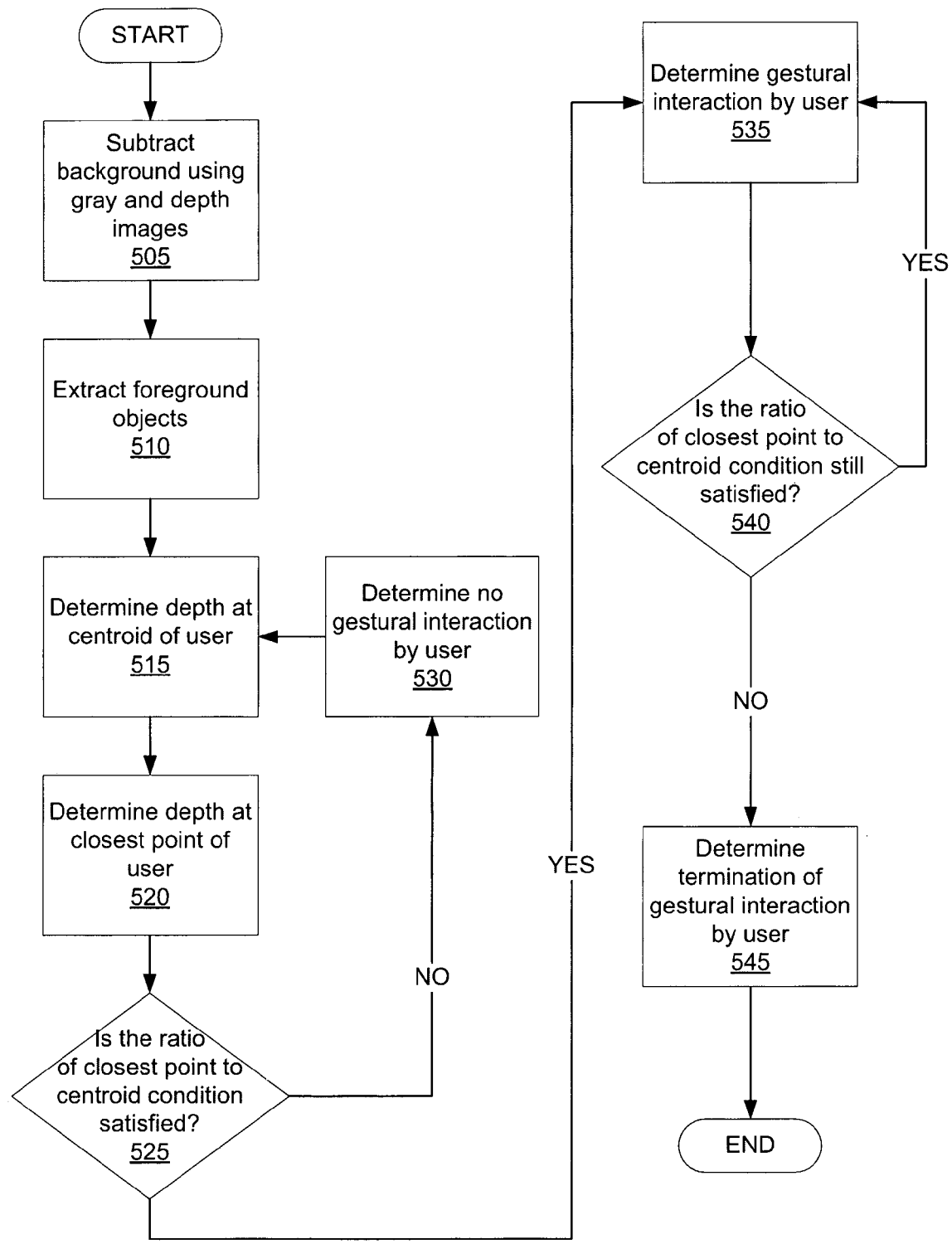
FIG. 5 is a flowchart showing an exemplary method of identifying gestural interaction, according to one example of the principle's described herein.

More detail with regard to the identification of a number of users, and identification of user movements as gestural interaction will now be discussed in connection with FIG. 5. FIG. 5 is a flowchart showing an exemplary method of identifying gestural interaction, according to one example of the principles described herein. The method may begin by subtracting the background of the scene (block 505) captured by the imaging device (110). Background subtraction separates desirable objects such as a number of users (120) from undesirable background objects within a captured image. In the present example, the gestural interactive system (100) extracts users (120) from within the image captured by the imaging device (110). In one example, the gestural interactive system (100) and, more specifically, the imaging device (110) utilizes both depth and color information to separate and subtract the background leaving the number of users (120) within the image.

Combining both the intensity and depth information for background subtraction allows for the gestural interactive system (100) to take advantage of these two methods without dealing with the drawbacks or insufficiencies of the two methods if either were used alone. For example, two common drawbacks of using color information alone exist. First, if the foreground comprises objects that are of a similar color as objects within the background, the foreground objects might be erroneously removed. Second, shadows cast in the background may be identified as foreground objects instead. Further, drawbacks exist in connection with the use of only depth information. Although depth information is less susceptible to ambient light conditions such as, for example, shadow and low light, and the above described color similarity, the drawback of using depth images alone is that a foreground object which lies in close proximity with the background may be erroneously classified as part of the background. Thus, combining both depth and color information for background subtraction eliminates these disadvantages while taking advantage of the benefit of both methods.

Background subtraction may start by converting the color image obtained from the RGB camera of the imaging device (110) to a grayscale image. This grayscale image may be denoted as "GI." The imaging device (110) may also capture depth information or data using the depth sensor of the imaging device (110). In a similar manner, the depth information may be denoted as "Depth." The gestural interactive system (100), and, particularly, the processor (125) forms a two-channel image whose pixels are encoded with (GI, Depth) values. The two channel image is then subjected to background subtraction. Various illustrative applications and examples of background subtraction are given in "Learning OpenCV: Computer Vision with the OpenCV Library", G. Bradski and A. Kaehler, O'Reilly Media, ISBN-10: 0596516134, 2008 (p. 265 et seq.), which is incorporated by reference herein in its entirety.

At block 510 of FIG. 5, foreground objects are extracted from the image captured by the imaging device (110). In one example, the processor (125) extracts foreground objects by finding connected components in background subtracted depth images. This results in a number of portions N within the depth image that correspond to segmented users. The resulting image may be denoted by segmented user image (SUI) and the segmented users may be denoted by the set $\{H_i\}_{i=1,\ldots,N}$. Thus, the processed image now comprises a number of users within a background and foreground-extracted scene. Blocks 505 and 510 are performed for each frame of video captured by the imaging device (110).

The depth of the centroid and closest point of each user (120) is then determined (blocks 515 and 520, respectively). Once the segmented users in the scene have been identified by the gestural interactive system (100) through background subtraction and connected component analysis, the condition at which the virtual action bubble (305) surrounding each user (120) breaks is determined (blocks 515 through 535). For i=1, ..., N the processor (125) computes the centroid of $H_i$ for each user (120) in the scene, and obtains the corresponding depth value. In this example, the depth value refers to the grey value (0-255) of the pixels in the depth image. This set of depth values for the centroid may be denoted by $\{d_{ci}\}$; for i=1, ..., N. Thus, in one example, the spatial location of all the non-zero pixel values within the segmented user image may be averaged to determine the location of the centroid of each user (120) in the scene, individually.

For i=N, the processor (125) obtains the closest point to the imaging device (110); the closest point being the brightest or darkest pixel in $H_i$ depending on whether the depth data indicates relatively closer pixels as being relatively lighter or relatively darker on a scale from 0 to 255. The closest point values are recorded in the set $p_i$. As briefly described above, the processor (125) computes the ratio of the closest distance and the depth value at the centroid and determines if that ratio is or is not above a predetermined threshold (block 525). The predetermined threshold may be denoted as the "stretch factor," or "τ." In practice, the stretch factor, τ, represents a partly stretched portion of a user's body such as, for example, a hand or arm that the action bubble (305) can accommodate at a given distance. If a user's hand extends beyond τ (block 525, determination YES), then the action bubble (305) "bursts." The gestural interactive system (100) recognizes the action bubble burst as the initiation of an interactive gesture and begins to issue commands based in the user's gestures (block 535). Thus, the action bubble burst condition is satisfied if the ratio:

$$\frac{p_i}{d_{ci}} > \tau_i \qquad (1)$$

where $\tau_i$ is the estimated stretch factor at $d_{ci}$. An action bubble (305) is calculated for each user (120) within the image(s) captured by the imaging device (110).

If, however, a user's hand does not extend beyond τ (block 525, determination NO), then the action bubble (305) does not burst, and the gestural interactive system (100) does not recognize the user's gestures as the initiation of an interactive gesture. Instead, any gestures made by the user (120) under this condition will be disregarded as unintentional gestures (block 530). The gestural interactive system (100) may then continue to determine the depth of the user's centroid (average depth of a user) and closest point of that user (120), and determine whether the above-described bubble burst condition has been met (block 525). Blocks 515 through 530 may be performed at any interval and for any number of iterations until the bubble burst condition has been met (block 525, determination YES).

Further, in connection with the above detection and initiation of gestural interaction by a number of users, the gestural interactive system (100) determines when intentional gestural interaction by the user (120) terminates. At block 540, the gestural interactive system (100) determines whether the ratio of the closest distance and the depth value at the centroid is still above the predetermined threshold (block 540). In other words, the gestural interactive system (100) determines if the ratio of $p_i$ to $d_{ci}$ is greater than $\tau_i$. If this action bubble burst condition is still met (block 540, determination YES); then the method loops back to block 535 and the gestural interactive system (100) continues to recognize the user's interactive gestures, and continues to issue commands based in the user's gestures (block 535). However, if this action bubble burst condition is no longer met (block 540, determination NO), then the gestural interactive system (100) recognizes this as a termination of gestural interaction by the user (120), and no longer issues commands based on the user's gestures (block 545). Generally, the gestural interactive system (100) may, at any time and for any number of iterations, determine whether the action bubble burst condition has been met.

The action bubble (305) shrinks with an increase in user's distance from the imaging device (110) as far away objects appear smaller as compared to nearer objects in the depth image. Hence, in a quantitative manner, τ is inversely proportional to the user's distance from the imaging device (110) and directly proportional to the length of his or her fully stretched hand at the same distance. In other words, the length of a partially stretched hand is a fraction of the fully stretched hand. Mathematically the above relationship can be written as follows:

$$\tau = k \times \frac{\text{Depth value of a fully stretched hand}}{\text{Distance of the user from imaging device}} \qquad (2)$$

where k is the constant of proportionality which is determined empirically. In one example, each user (120) has a separate action bubble (305). In this example, the decision making by the gestural interactive system (100) is individualized for each user (120) and independent of actions performed by other users (120).

In order to adapt each action bubble (305) to work at various distances the gestural interactive system (100) determines how τ varies with distance from the imaging device (110). In other words, the gestural interactive system (100) determines τ as a function of distance. Two assumptions may be made in this circumstance. First, since the user (120) generally stands parallel to the imaging device's (110) image plane, the depth value at the centroid of the user (120) with respect to the imaging device (110) may be approximated by the depth value at the user's centroid. Second, the depth values at the user's palm region, for example, may represent the extent to which a user's hand has moved. For characterization purposes based on hand movement a variable "a" may be used given by:

$$\alpha = \frac{\text{Depth value at the palm of a fully stretched hand}}{\text{Depth value at the centroid}} \qquad (3)$$

Based on equations (2) and (3) above:

$$\tau = k\alpha \quad (4)$$

where k is a constant which is determined empirically. In a physical sense, equation (4) represents the extent of a partly stretched hand beyond which the action bubble burst takes place.

Figure 6:
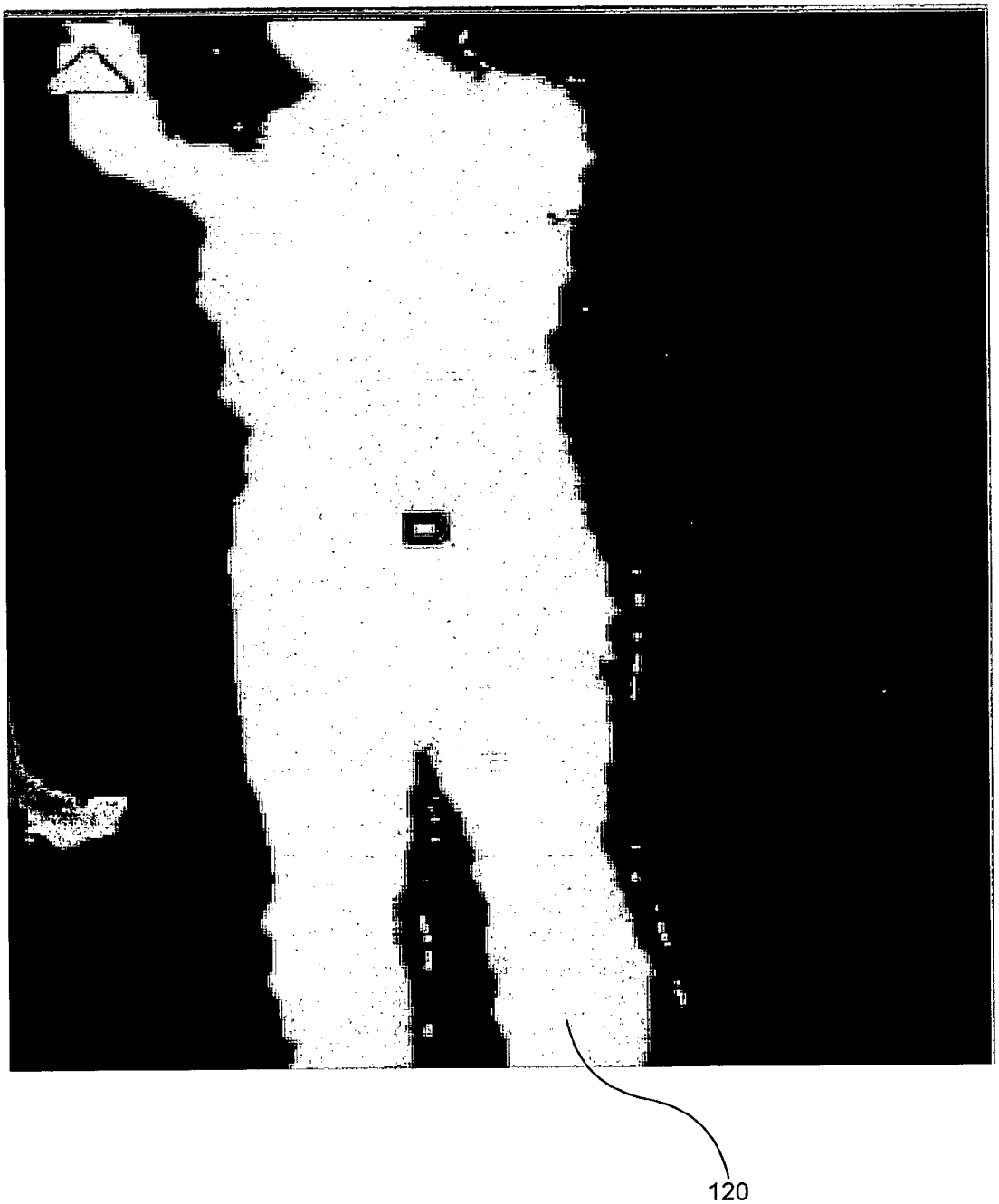
FIG. 6 is a screen shot of a depth image of a segmented user, according to one example of the principles described herein.

The variable α may be determined by the gestural interactive system (100) for distances ranging from 1 m to 3 m with intervals of 0.5 m, for example. An experimental setup describing this determination is shown in FIG. 6. FIG. 6 is a screen shot of a depth image of a segmented user, according to one example of the principles described herein. In FIG. 6, the triangle (located on the user's hand) represents the closest point to the imaging device (110) and the square (located on the user's torso) represents the centroid of the user (120). The variable α is obtained by calculating the ratio of the gray values in triangle and square. This process is repeated at various distances.

Figure 7:
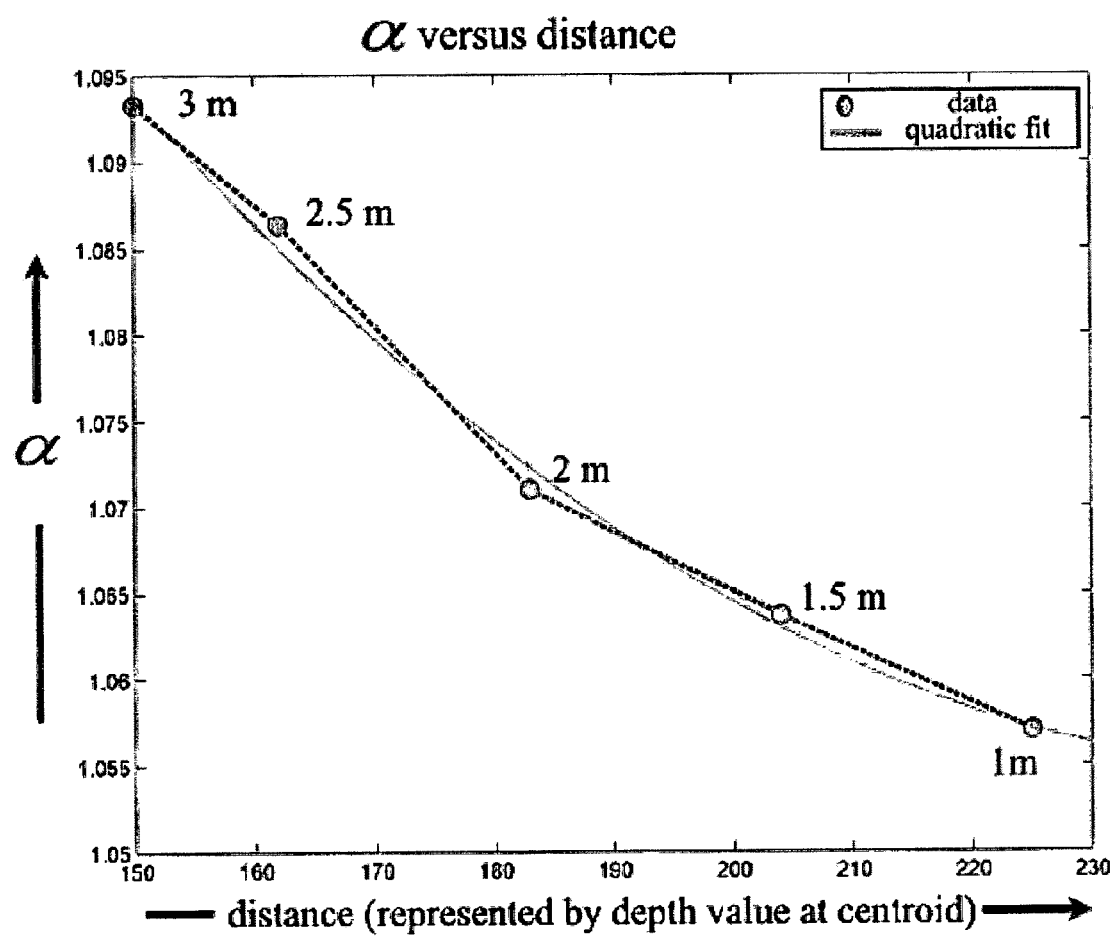
FIG. 7 is a plot of the variable α versus distance of a user from an imaging device, according to one example of the principles described herein.

FIG. 7 is a plot of the variable α versus distance of a user (120) from an imaging device (110), according to one example of the principles described herein. The graph of FIG. 7 depicts the variation of α with respect to the change in distance between the user (120) and the imaging device (110). Here the depth at the centroid of the user (120) is the average distance from the imaging device (110) of the pixels of a segmented user. In one example, a data point at 3 meters may be taken into consideration. This implies that when the user (120) is standing at a distance of 3 m from the imaging device (110), the depth value at the centroid represented by its gray level is approximately 150, and the corresponding value of α as computed by equation (3) is 1.094.

In the present example, far away objects are represented in a depth image by relatively lower grey values (darker) than the nearer objects, which are represented by relatively higher grey values (lighter). Once a plot of the variable α versus distance of a user (120) from the imaging device (110) has been obtained, a regression curve (represented by a solid line in the plot of FIG. 7) is fit to the data and the variable α is obtained as a function of distance, which in this case is given by:

$$\alpha = (4 \times 10^{-6})d^2 - 0.002d + 1.2992 \quad (5)$$

where d is the depth at the user's (120) centroid. With this information, the depth values of a fully stretched hand at any distance from the imaging device (110) can be estimated, and from equations (4) and (5), stretch factor τ can be determined by the gestural interactive system (100) at any distance.

As briefly discussed above, the gestural interactive system (100) may configure the action bubble (305) to be of any shape depending on environmental factors such as, for example, the posture of the user (120), (reclining sitting, or standing) and the application for which the action bubble (305) is to be used, among others. In a situation where the user (120) is sitting or reclining, the gestural interactive system (100) may disregard portions of the user's body in order to accurately determine the centroid of the user (120), and, in turn, accurately determine whether the action bubble (305) has been burst throughout the use of the gestural interactive system (100). For example, a sitting user's legs may be disregarded or even subtracted from the image since the user's legs protrude from the actual and intended centroid of the user (120), and diverge or deviate from what is intended to be an average depth. In this manner, just the torso or upper portion of the sitting user's body may be considered in determining the centroid of the user (120).

Further, in the case of a reclining user (120), the gestural interactive system (100) determines an axis of the user (120). Depending on the vertical or horizontal orientation of the axis, the gestural interactive system (100) can determine whether the user (120) is reclining or standing, and, in turn, can adjust the action bubble (305) of that user (120) in order to more accurately determine initiation of an interactive gesture as described herein.

The above described system and method was tested in various situations. These experiments will now be described in more detail. In all the below experiments, the centroid of the user (120) or users are represented with a square. Further, the closest point to the imaging device (110) within a segmented user image is represented by a circle if the closest point is within the action bubble (305) (below the predetermined threshold) and is represented by a triangle if the closest point is outside the action bubble (305) (above the predetermined threshold. Further, the number of users (120) in FIGS. 8 through 17 are generally identifiable by gray areas as opposed to the black background.

Figure 8:
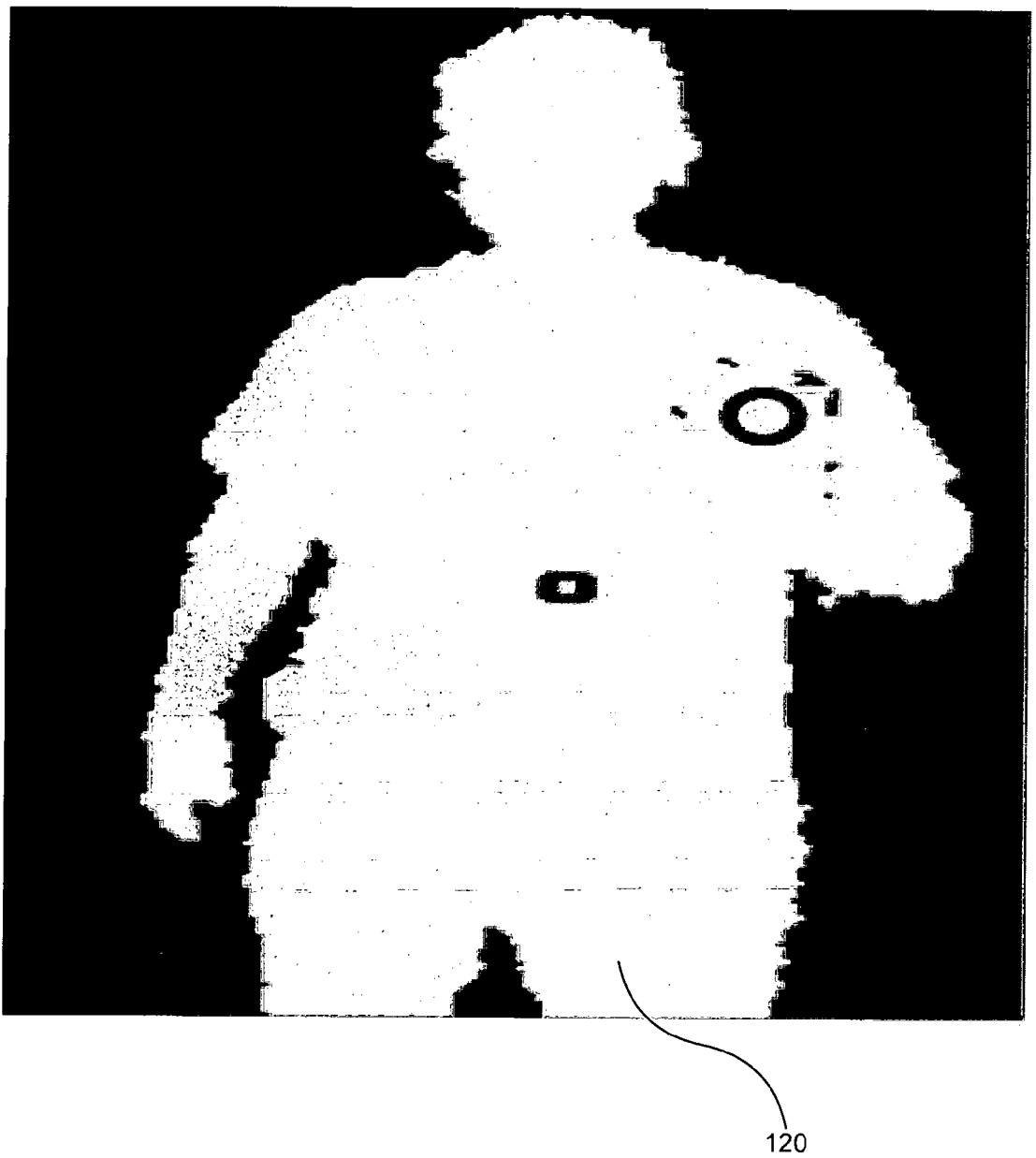
FIG. 8 is a screen shot of a depth image of a segmented user, in which the user has not burst the action bubble, according to one example of the principles described herein.
Figure 9:
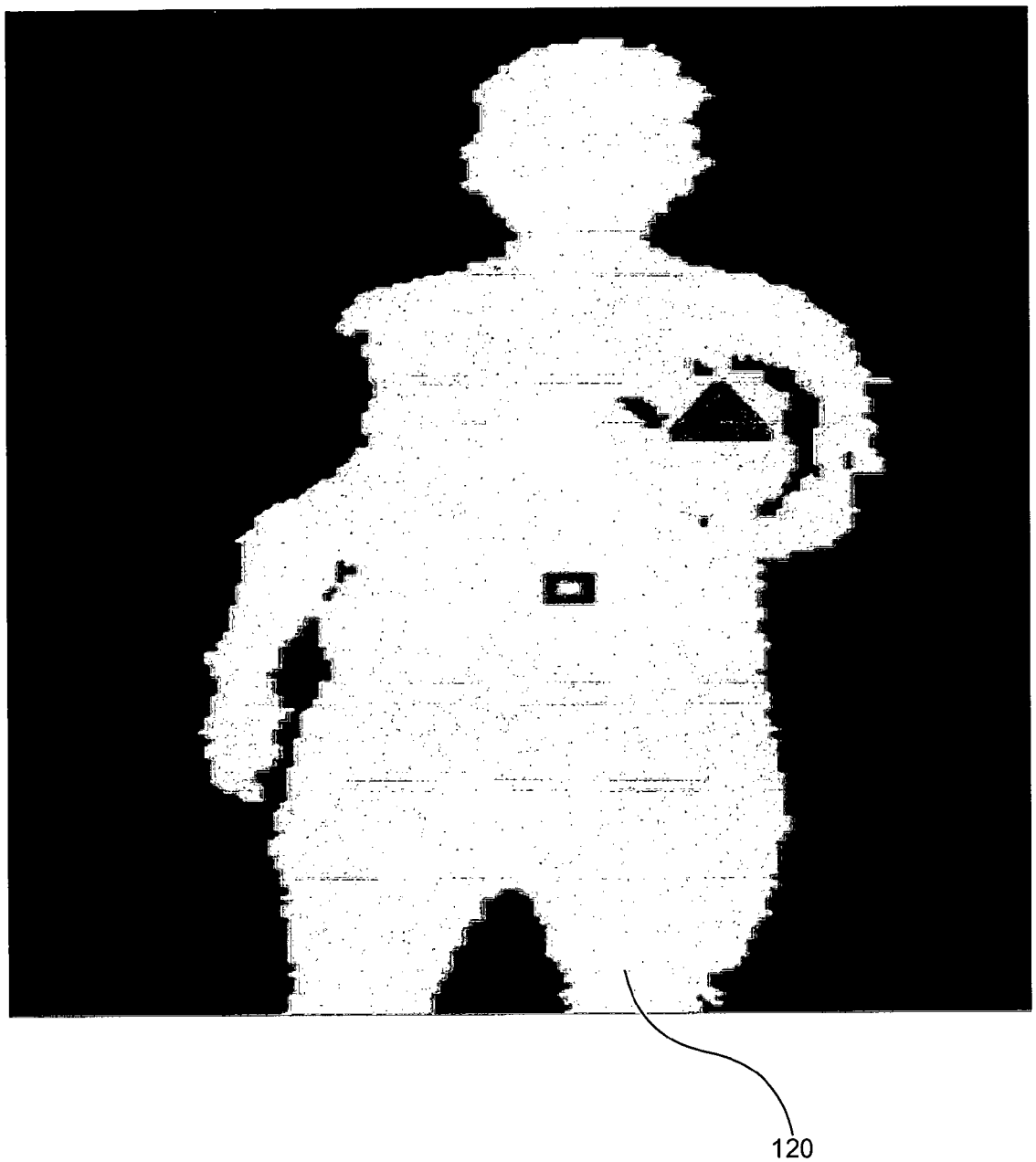
FIG. 9 is a screen shot of a depth image of the segmented user of FIG. 8, in which the user has burst the action bubble, according to one example of the principles described herein.

FIG. 8 is a screen shot of a depth image of a segmented user (120), in which the user (120) has not burst the action bubble (305), according to one example of the principles described herein. FIG. 9 is a screen shot of a depth image of the segmented user (120) of FIG. 8; in which the user (120) has burst the action bubble (305), according to one example of the principles described herein. In this first experiment the action bubble concept for a single user (120) is demonstrated. FIG. 8 depicts the segmented user image with the user's (120) hand in a first position within the action bubble (305). As the user's hand is inside the action bubble, a circle is displayed. FIG. 9 depicts the segmented user image with the user (120) stretching his hand, and in which the bursting of the action bubble is satisfied as indicated by the triangle. In FIG. 9, since the user's (120) hand has burst the action bubble (305), the gestural interactive system (100) will determine that an intended gesture has been initiated, and will begin to interact with the user (120) and issue commands based in the user's gestures.

Figure 10:
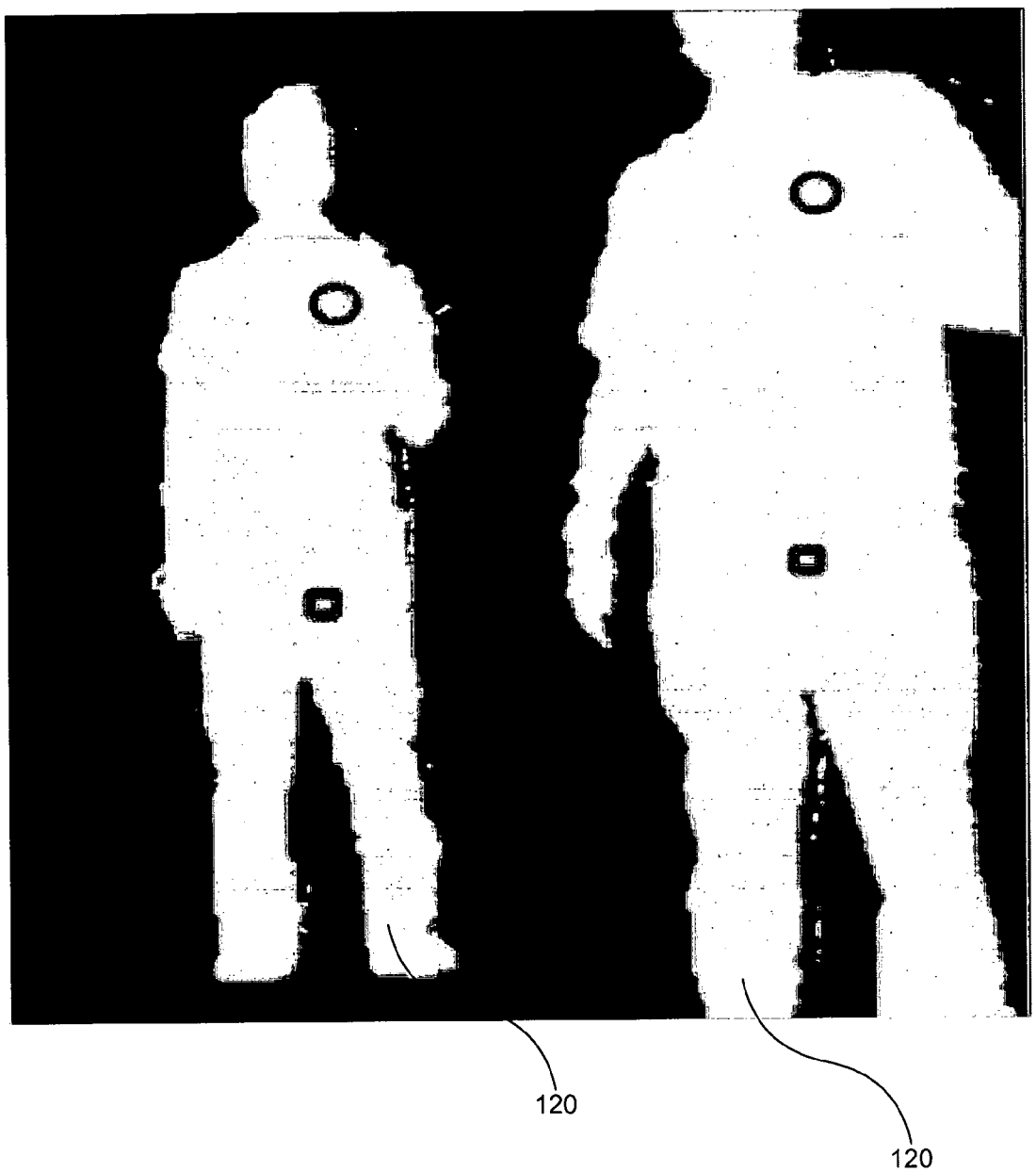
FIG. 10 is a screen shot of a depth image of a number of segmented users, in which the users have not burst their respective action bubbles, according to one example of the principles described herein.
Figure 11:
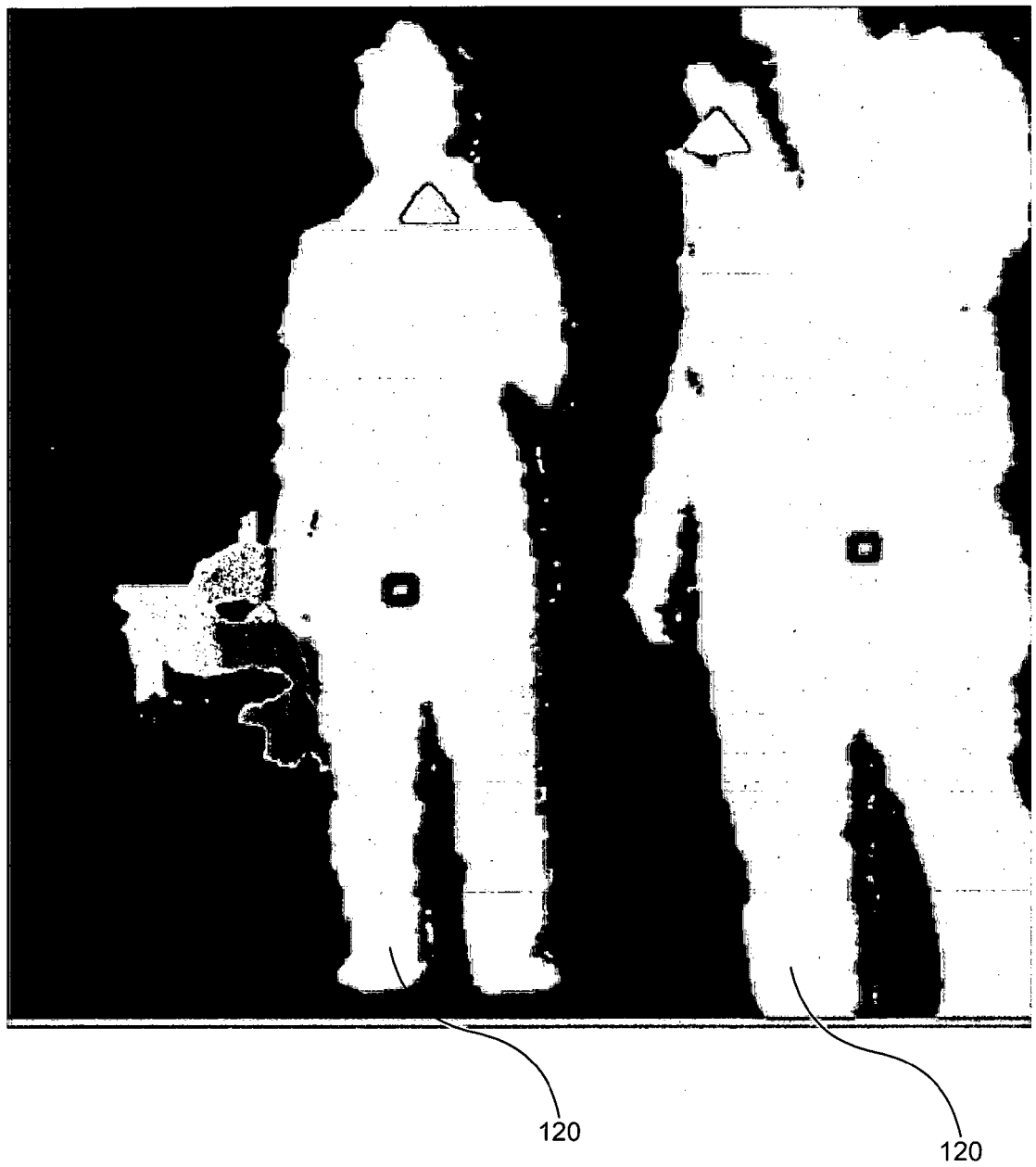
FIG. 11 is a screen shot of a depth image of the segmented users of FIG. 10, in which the users have burst their respective action bubbles, according to one example of the principles described herein.

FIG. 10 is a screen shot of a depth image of a number of segmented users (120), in which the users (120) have not burst their respective action bubbles, according to one example of the principles described herein. FIG. 11 is a screen shot of a depth image of the segmented users (120) of FIG. 10, in which the users (120) have burst their respective action bubbles, according to one example of the principles described herein. This second experiment depicts two users (120) standing at different distance from the imaging device (110). As the hand of both the users is within their respective action bubbles initially, two corresponding circles are depicted FIG. 10. However, in FIG. 11 the users (120) stretch their hands out, and once the action bubble burst condition is met for either or both of the user's respective action bubbles (305), the circles turns into triangles as shown in FIG. 11.

Figure 12:
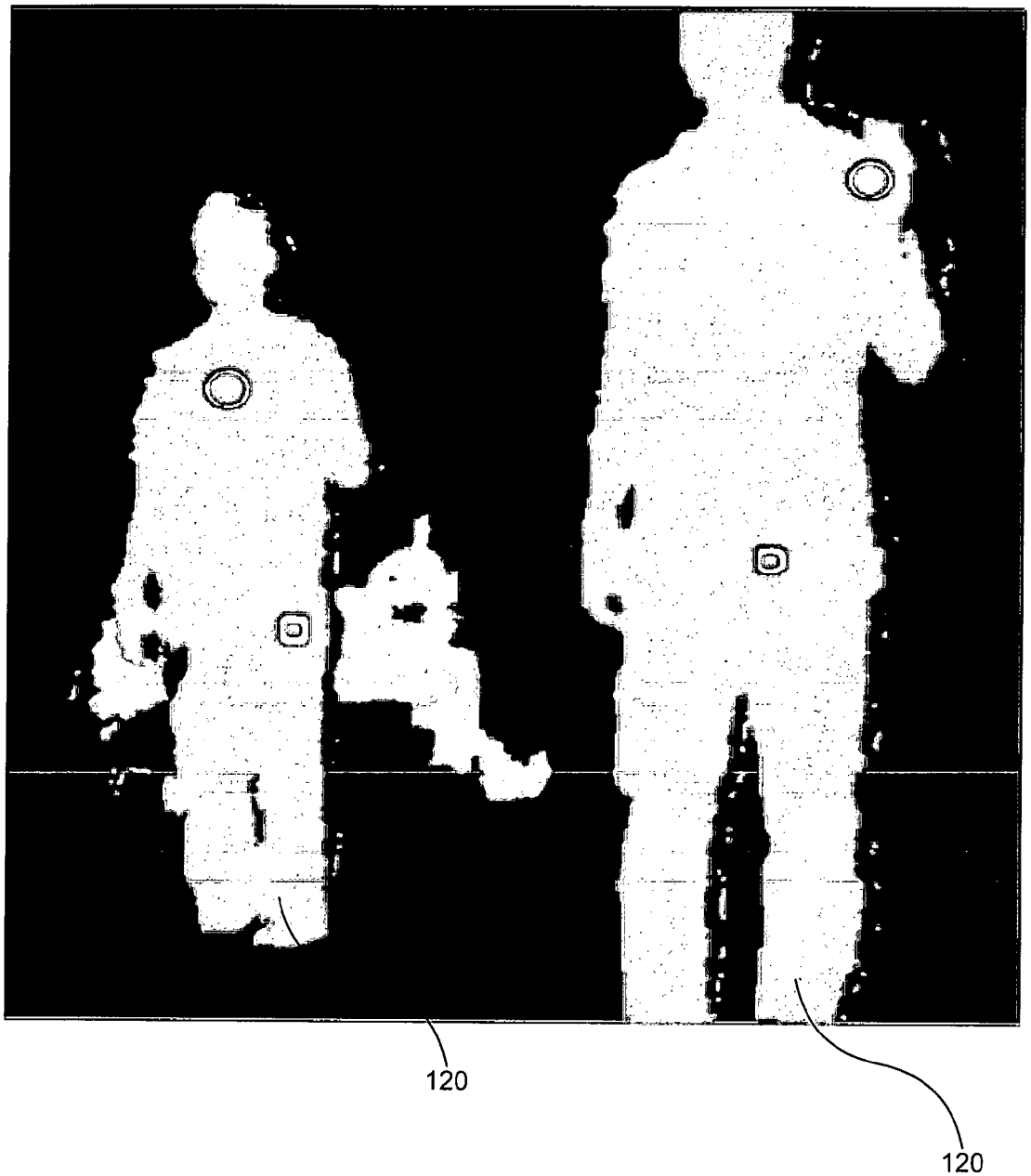
FIG. 12 is a screen shot of a depth image of a number of segmented users, in which the users have not burst their respective action bubbles, according to one example of the principles described herein.
Figure 13:
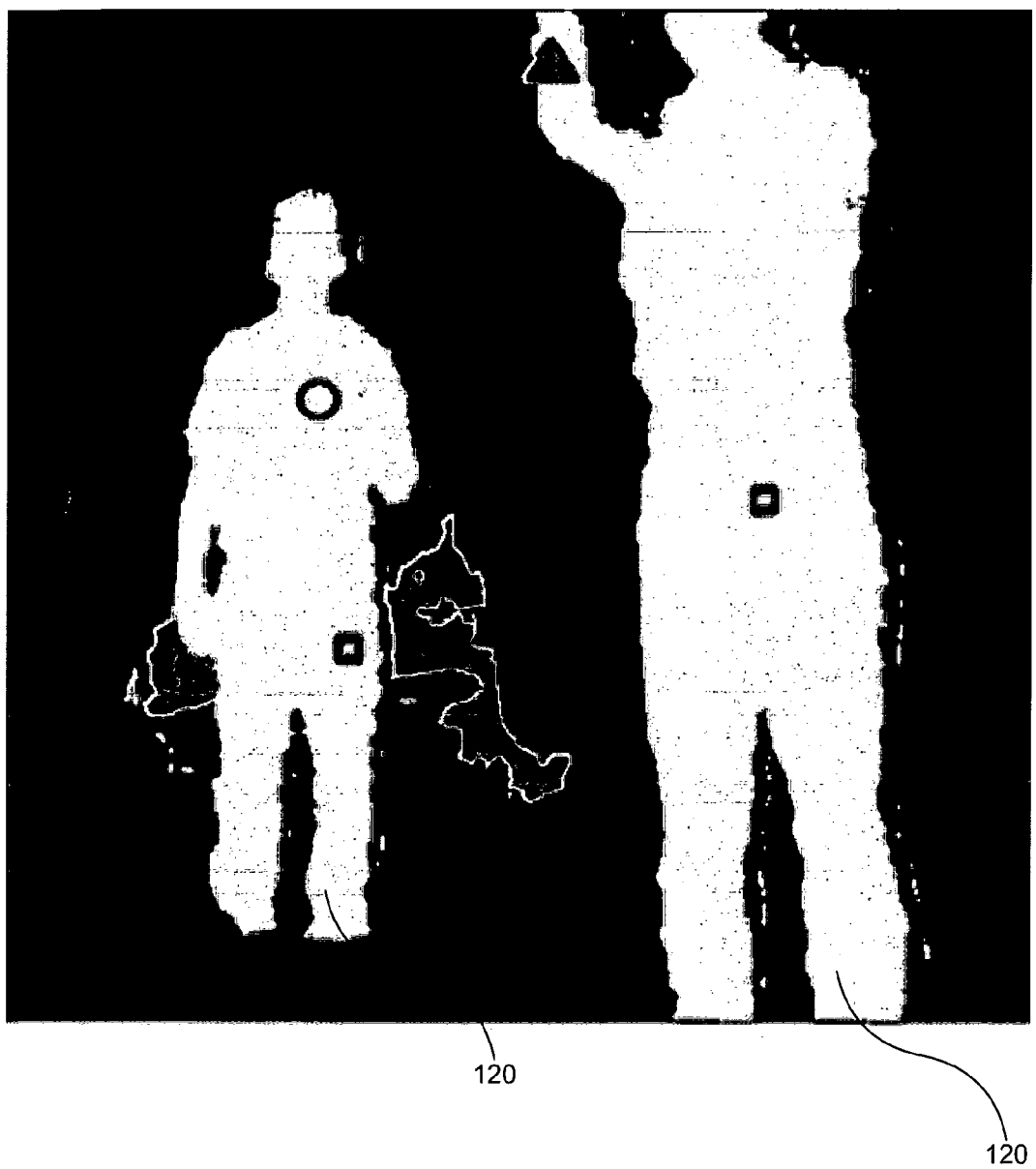
FIG. 13 is a screen shot of a depth image of the segmented users of FIG. 12, in which only one of the users has burst his respective action bubble, according to one example of the principles described herein.

FIG. 12 is a screen shot of a depth image of a number of segmented users (120), in which the users (120) have not burst their respective action bubbles, according to one example of the principles described herein. FIG. 13 is a screen shot of a depth image of the segmented users (120) of FIG. 12, in which only one of the users (120) has burst his respective action bubble, according to one example of the principles described herein. This third experiment was carried out with two users (120) to show the independent nature of the action bubbles of each user (120). FIG. 13, in particular, depicts the case in which the user (120) on the right of the segmented user image stretches the hand whereas the left user's hand remains unchanged from FIG. 12. As the left user's hand remains within the bubble as indicated by the circle, the right user's hand stretches outside the bubble and this condition is indicated by a triangle. This demonstrates that the action bubbles work individually for all the users (120) in a scene.

Figure 14:
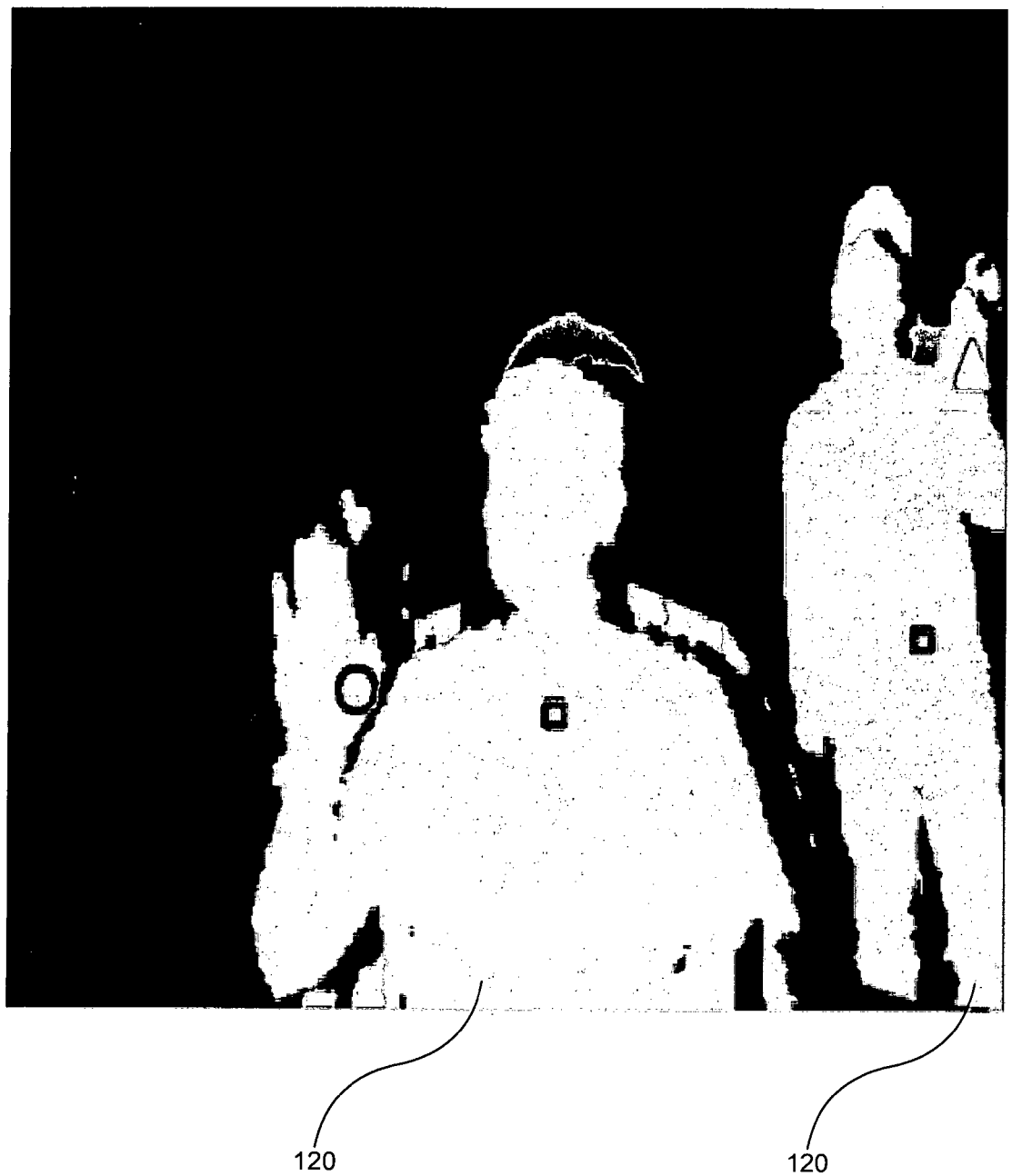
FIG. 14 is a screen shot of a depth image of a number of segmented users, in which the users have not burst their respective action bubbles and in which one of the users is in a sitting position, according to one example of the principles described herein.
Figure 15:
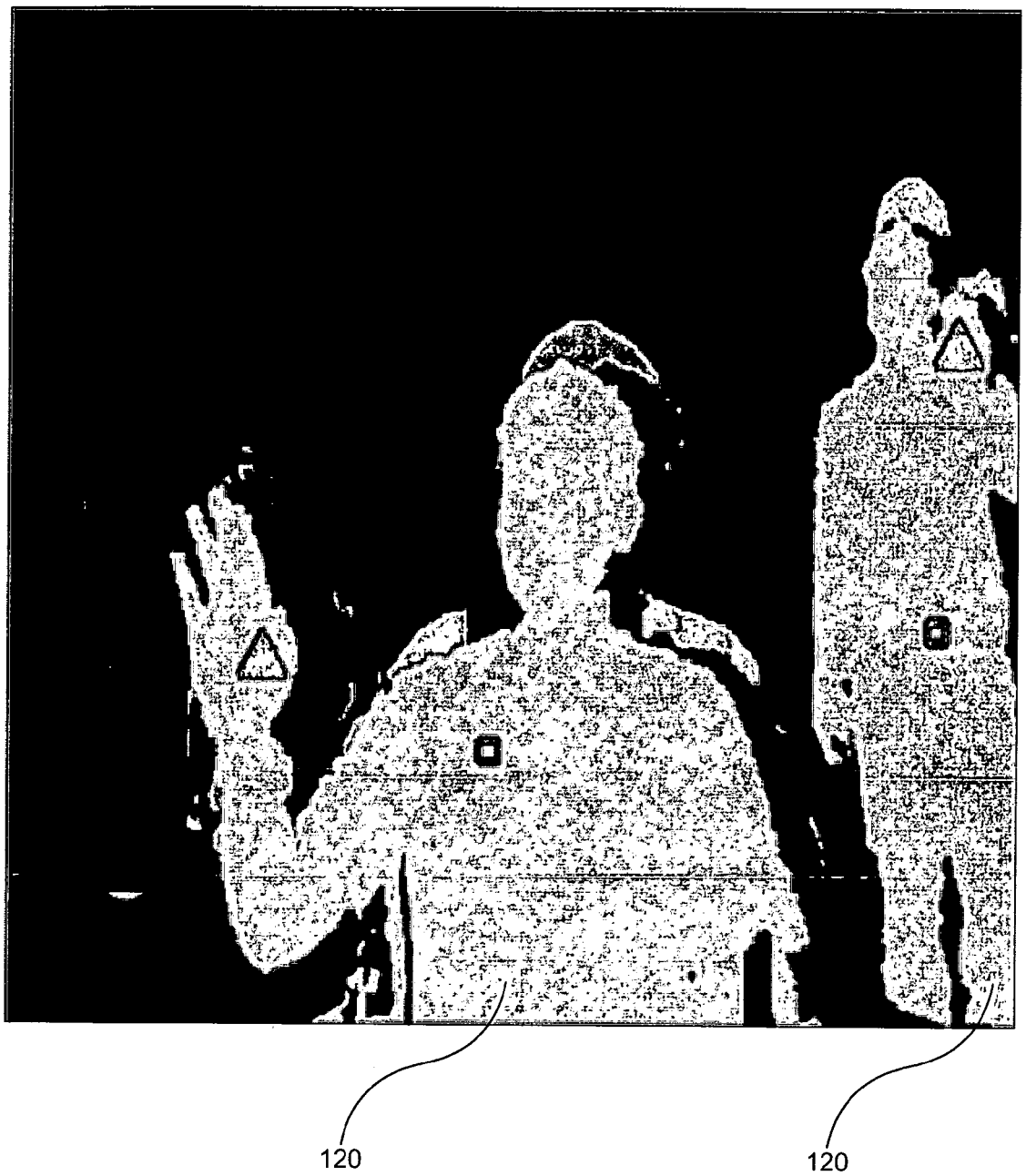
FIG. 15 is a screen shot of a depth image of the segmented users of FIG. 14, in which the users have burst their respective action bubbles, according to one example of the principles described herein.

FIG. 14 is a screen shot of a depth, image of a number of segmented users (120), in which the users (120) have not burst their respective action bubbles and in which one of the users (120) is in a sitting position, according to one example of the principles described herein. FIG. 15 is a screen shot of a depth image of the segmented users (120) of FIG. 14, in which the users (120) have burst their respective action bubbles, according to one example of the principles described herein. This fourth experiment was carried out to test the performance of the action bubbles of multiple users (120) when the background comprises furniture such as an office chair. FIG. 14 depicts a scene in which one of two users (120) sits on the chair and another user (120) stands at a different depth. The standing user's hand is outside his respective action bubble (305) initially, a triangle designating this situation. FIG. 15 depicts a segmented user image in which the sitting user (120) stretches his hand. This fourth experiment was performed to test whether the action bubble (305) of a sitting user (120) would function in a manner similar to the action bubble (305) of a standing user (120).

Figure 16:
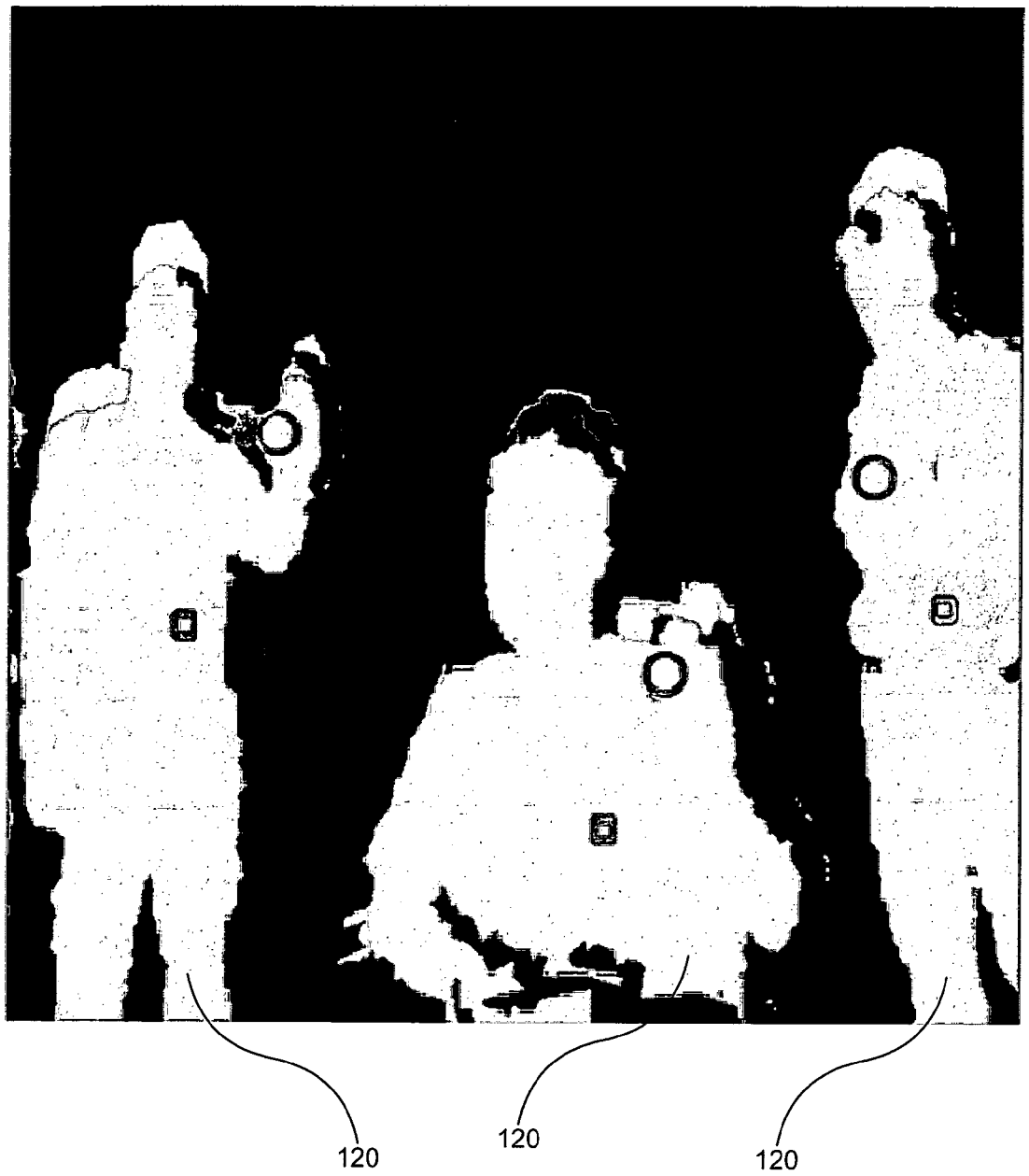
FIG. 16 is a screen shot of a depth image of a number of segmented users, in which the users have not burst their respective action bubbles and in which one of the users is in a sitting position, according to one example of the principles described herein.
Figure 17:
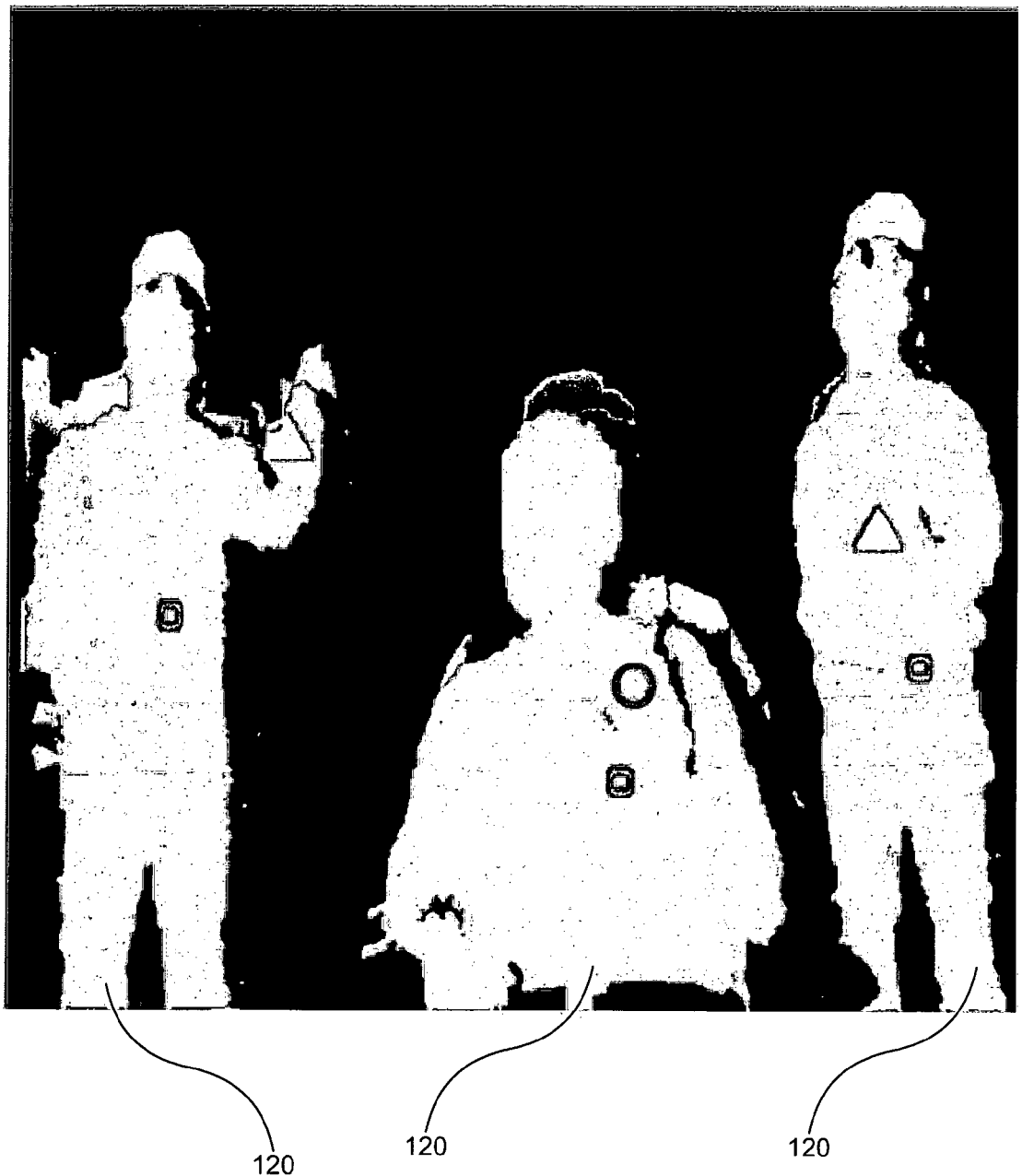
FIG. 17 is a screen shot of the depth image of the segmented users of FIG. 16, in which the users have burst their respective action bubbles and in which one of the users is in a sitting position, according to one example of the principles described herein.

FIG. 16 is a screen shot of a depth image of a number of segmented users (120), in which the users (120) have not burst their respective action bubbles and in which one of the users (120) is in a sitting position, according to one example of the principles described herein. FIG. 17 is a screen shot of a depth image of the segmented users (120) of FIG. 16, in which the users (120) have burst their respective action bubbles and in which one of the users (120) is in a sitting position, according to one example of the principles described herein. This fifth experiment repeats the scenario in the fourth experiment but with three users (120) as depicted in FIGS. 16 and 17.

Therefore, based on the above experiments, the present system and method may be utilized to identify a number of users (120) in a scene. Further, the present system and method can detect each user's initiation of an interactive gesture independent of other users.

The specification and figures describe a system and associated method that detects and triggers the initiation and termination of a number or series of gestural interactions. The gestural interactive system utilizes a ratio of the closest distance and the depth value at the centroid of a user being above a predetermined threshold to identify the initiation of a gestural interaction. Similarly, the gestural interactive system utilizes the ratio of the closest distance and the depth value at the centroid of a user being below the predetermined threshold to identify the termination of the gestural interaction. This gestural interaction identification system and method may have a number of advantages, including the following, among others: (1) the gestural interaction identification system and method does not involve learning a new gesture or action to begin a gestural interaction; (2) the user intuitively extends his or her hand away from the body to start an interaction; (3) there is no need to carry or use an accessory to interact with a system; and (4) in the case of multiple users, each user has his or her own bubble, and so the interface can respond to each user's state independent of other users.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of identifying gestural interaction comprising:
   detecting a user with an imaging device;
   detecting with the imaging device the depth value at a centroid of the user with respect to the imaging device, comprising:
      determining the centroid location of the user and the depth value of the centroid location;
   detecting with the imaging device a closest distance of the user with respect to the imaging device, comprising:
      determining a closest user feature within the image of the user; and
   with a processor, identifying an initiation of a gestural interaction based on a ratio of the closest distance and the depth value at the centroid of the user is above a predetermined threshold.

2. The method of claim 1, in which detecting a user with an imaging device comprises:
   imaging a scene comprising the user and images of objects to be removed with the imaging device, in which the imaging device comprises a color imaging device and a depth sensor;
   sending a color image and a depth image captured by the imaging device to the processor;
   converting the color image obtained from the imaging device into a grayscale image; and
   with the processor, subtracting the background using the grayscale image and the depth image.

3. The method of claim 1, in which, if the ratio of the closest distance and the depth value at the centroid of the user is above the predetermined threshold, then, with the processor, initiating recognition of the user's gestures as gestural interaction.

4. The method of claim 1, in which, if the ratio of the closest distance and the depth value at the centroid of the user is below the predetermined threshold, then not initiating recognition of the user's gestures as gestural interaction.

5. The method of claim 1, in which, if the ratio of the closest distance and the depth value at the centroid of the user falls below the predetermined threshold, then terminating recognition of the user's gestures as gestural interaction.

6. The method of claim 1, in which identifying the initiation of a gestural interaction is individually performed for each of a number of users detected by the imaging device.

7. A gestural interaction system comprising:
   an imaging device that detects a depth value at a centroid of a user and a closest distance of the user relative to the imaging device, including determining the centroid location of the user, a depth value of the centroid location, and a closest user feature within the image of the user; and
   a processor that identifies an initiation of a gestural interaction based on whether a ratio of the closest distance and a depth value at the centroid of the user is above a predetermined threshold.

8. The system of claim 7, in which the imaging device comprises:
   a color imaging device; and
   a depth sensor that determines the depth value of objects within the field of view of the imaging device.

9. The system of claim 7, further comprising a display device for displaying feedback to the user based on the user's gestural interaction.

10. The system of claim 7, further comprising a data storage device communicatively coupled to the processor, in which the data storage device stores executable code that, when executed by the processor, causes the gestural interaction system to interact with the user.

11. A computer program product for identifying initiation and termination of gestural interaction within a gestural interaction system, the computer program product comprising:
- a non-transitory computer readable storage medium having computer usable program code embodied therewith, the computer usable program code comprising:
- computer usable program code that identifies an initiation of a gestural interaction by a user depending on whether a virtual bubble around the user has been broken;
- computer usable program code that detects with an image device a user, a depth value at a centroid of the user with respect to the imaging device, and a closest distance of the user with respect to the imaging device, including determining the centroid location of the user, a depth value of the centroid location, and a closest user feature within the image of the user;
- computer usable program code that determines whether to initiate recognition of the user's gestures as gesture interaction based on a ratio of a closest distance of the user with respect to an imaging device and a depth value at a centroid of the user compared to a predetermined threshold value.

12. The computer program product of claim 11, further comprising computer usable program code that initiates the recognition of the user's gestures as gestural interaction if the ratio is above the predetermined threshold.

13. The computer program product of claim 11, further comprising computer usable program code that does not initiate recognition of the user's gestures as gestural interaction if the ratio is below the predetermined threshold.

* * * * *